United States Patent
Stabrey

(10) Patent No.: US 8,457,852 B2
(45) Date of Patent: Jun. 4, 2013

(54) DEVICE AND METHOD FOR PREVENTING A MOTOR VEHICLE ENGINE FROM STOPPING IN AN AUTOMATIC BRAKE OPERATION

(75) Inventor: Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 928 days.

(21) Appl. No.: 12/316,792

(22) Filed: Dec. 15, 2008

(65) Prior Publication Data

US 2009/0164079 A1    Jun. 25, 2009

(30) Foreign Application Priority Data

Dec. 19, 2007 (DE) .......... 10 2007 061 232

(51) Int. Cl.
G06F 19/00 (2011.01)

(52) U.S. Cl.
USPC .......... 701/70; 701/51; 701/53; 701/76; 701/93

(58) Field of Classification Search
None
See application file for complete search history.

(56) References Cited

U.S. PATENT DOCUMENTS

| | | | | |
|---|---|---|---|---|
| 5,597,215 A | * | 1/1997 | Fischle et al. | 303/139 |
| 5,928,111 A | * | 7/1999 | Sakakibara et al. | 477/181 |
| 6,253,656 B1 | * | 7/2001 | Gilles | 91/367 |
| 6,641,505 B2 | * | 11/2003 | Sayman et al. | 477/177 |
| 7,305,294 B2 | * | 12/2007 | Bate et al. | 701/93 |
| 2003/0144114 A1 | * | 7/2003 | Sayman et al. | 477/175 |
| 2004/0155811 A1 | * | 8/2004 | Albero et al. | 342/70 |
| 2005/0187693 A1 | * | 8/2005 | Bate et al. | 701/70 |
| 2006/0097570 A1 | * | 5/2006 | Doerr et al. | 303/193 |
| 2006/0100765 A1 | * | 5/2006 | Matsubara et al. | 701/51 |

FOREIGN PATENT DOCUMENTS

| | | |
|---|---|---|
| DE | 10 2006 034 808 | 10/2007 |
| JP | 2002-206440 | 7/2002 |
| JP | 2005-96544 | 4/2005 |

* cited by examiner

*Primary Examiner* — Khoi Tran
*Assistant Examiner* — Jonathan L Sample
(74) *Attorney, Agent, or Firm* — Kenyon & Kenyon LLP

(57) ABSTRACT

A device and method for preventing a motor vehicle engine from stopping are described, which includes a device for preventing a motor vehicle engine from stopping in an automatic brake operation, the device including the following features of a unit for providing an engine speed signal that corresponds to the speed of the motor vehicle engine, and a brake interruption unit, which is developed to interrupt the brake operation if the engine speed signal assumes a value that lies below a predetermined threshold value, the threshold value being greater than an engine stop threshold value that indicates a minimum speed of the motor vehicle engine.

19 Claims, 1 Drawing Sheet

DEVICE AND METHOD FOR PREVENTING A MOTOR VEHICLE ENGINE FROM STOPPING IN AN AUTOMATIC BRAKE OPERATION

FIELD OF THE INVENTION

The present invention relates to a device for preventing a motor vehicle engine from stopping (also called "stalling" in the following) in an automatic brake operation, and a method for preventing a motor vehicle engine from stopping in an automatic brake operation.

BACKGROUND INFORMATION

Today, a plurality of assistance and safety systems help drivers manage the task of driving. These include systems such as ABS and ESP, ACC, airbags and other restraint systems. Automatically triggered brake operations are intended to prevent a collision. Such systems, such as automatic emergency braking (AEB), normally trigger a brake operation only when the accident is unavoidable. Thus a collision will ensue in any event such that the condition of the vehicle following the braking intervention is of minor importance. The braking intervention is thus performed independently of the condition of the engine.

If a safety function is to intervene so as to avoid an accident, then it must be ensured that the driver is also able to continue to make his contribution toward accident prevention. This particularly includes his being able to move the vehicle out of a danger zone. In automatic brake functions, in which the driver must possibly still move the vehicle, the brake operation should therefore be performed in such a way that the engine of the vehicle is not stalled.

To this end, an approach is discussed in DE 10 2006 034 808 A1, "brake strategy for vehicles having a manual transmission". This method makes use of information about the vehicle movement, in particular the sideslip angle and the absolute value of the vehicle velocity. Today, due to high costs, sensors for measuring these variables are normally not available in the vehicle.

SUMMARY OF THE INVENTION

It is therefore an objective of the exemplary embodiments and/or exemplary methods of the present invention to create a possibility for improving the driving safety, in particular also to prevent the engine from stalling without the use of expensive sensors.

This objective may be achieved by a device having the features described herein, as well as by a method having the features described herein. Additional specific embodiments of the present invention are also described herein.

The exemplary embodiments and/or exemplary methods of the present invention is to a device for preventing a motor vehicle engine from stopping in an automatic brake operation, the device including the following features:
 a unit for providing an engine speed signal that corresponds to the speed of the motor vehicle engine; and
 a brake interruption unit, which is developed to interrupt or attenuate the brake operation if the engine speed signal assumes a value that lies below a predetermined threshold value, the threshold value being greater than an engine stop threshold value that indicates a minimum speed of the motor vehicle engine.

The exemplary embodiments and/or exemplary methods of the present invention is based on the recognition that the vehicle engine may be prevented from stalling in an automatic brake operation in a safety function, to which end the measured variables already available in the vehicle are used or reused. The engine speed or a corresponding signal is detected by the electronic engine controller and is already used for other safety functions such as the ESP, for example. In the process, by a simple evaluation of the actual speeds of the engine between the engine and the transmission, it is possible to detect that the speed is entering a low critical range in which the danger exists that the motor vehicle engine is stalled. The advantage of making such simple further use of sensor signals that are already available lies in a very simple and thus cost-effective construction of the mentioned device. Moreover, for determining and activating the brake interruption or brake attenuation, the use a threshold value that lies above the "stalling threshold" ensures that the automatic brake operation may be interrupted or attenuated in time before the motor vehicle engine actually stalls. This makes it possible appropriately to take into account e.g. the inertia of mechanical components of the brake unit that performs the automatic brake operation.

In another specific embodiment, the brake interruption unit may also be developed to continue to the automatic brake operation if the engine speed signal assumes a value that lies below an engine stop threshold value. This offers the advantage that by comparing the engine speed signal with the engine stop threshold value an inference may be made to the effect that the motor vehicle engine stalled in spite of the above-described brake interruption. Further braking by the automatic brake device is thus not relevant for stalling the engine, which in this case was brought about by other factors such as e.g. the fact that the vehicle was skidding or that the driver was performing a brake operation. This in turn makes it possible for the brake operation to be continued without limiting the driver's capacity to act in order to ensure that the (possibly skidding) motor vehicle comes to a stop as soon as possible.

It is also favorable if the brake interruption unit is developed in such a way that, following an interruption of the automatic brake operation, another brake operation is made possible again if the engine speed signal has a value that is greater than a brake enabling threshold value. If the vehicle speeds up again because of the interrupted (or attenuated) automatic brake operation—that is, the engine speed rises again—then it is possible to perform an automatic brake operation under the same safety-related aspects after the brake enabling threshold value has been exceeded. This ensures that e.g. even a vehicle rolling down a slope is decelerated effectively without stalling the engine. This thus further increases the safety gain of the motor vehicle equipped with the device provided above.

It is particularly favorable if the brake interruption unit is developed to use a brake enabling threshold value that is greater than the engine stop threshold value. This offers the advantage that there exists a certain "safety buffer" such that the motor vehicle engine, after it has stalled or after an automatic brake operation, first reaches a certain "increased" minimum speed that lies above the "stalling threshold" such that it may be assumed on account of the increased speed that the engine after stalling has started again and thus is running normally.

In another specific embodiment, the brake interruption unit may be developed to use a brake enabling threshold value that is greater than the threshold value. This offers the advantage of ensuring that the previously stalled engine may be safely started up before an automatic brake operation occurs again, which results in another increase of the above-mentioned safety buffer range.

According to another specific embodiment, the brake interruption unit may be designed as a logic structure. This allows for very simply designed, robust control circuits that may also be implemented efficiently in terms of data processing technology.

In an additional exemplary embodiment of the present invention, a method may be provided for preventing a motor vehicle engine from stopping in an automatic brake operation, the method including the following steps:
providing an engine speed signal that corresponds to the speed of the motor vehicle engine; and
interrupting or attenuating the brake operation if the engine speed signal assumes a value that lies below a predetermined threshold value, the threshold value being greater than an engine stop threshold value that indicates a minimum speed of the motor vehicle engine.

This allows for the exemplary embodiments and/or exemplary methods of the present invention to be implemented not only as a physical object, but also to implement the elements essential to the exemplary embodiments and/or exemplary methods of the present invention in the form of a working method (on any suitable device).

Accordingly, a computer program may also be provided for implementing the aforementioned method when the computer program is executed in a data processing unit. This allows for the efficient implementation of the exemplary embodiments and/or exemplary methods of the present invention in arbitrary computer units, which are already available everywhere in modern technical devices. The computer program may be executed, for example, in a board computer (such as an ESP control unit, for example) of the motor vehicle such that no additional expenditure arises in terms of circuit technology.

In the following, the exemplary embodiments and/or exemplary methods of the present invention is explained in greater detail by way of example with reference to the attached drawings.

DETAILED DESCRIPTION

Figure 1:
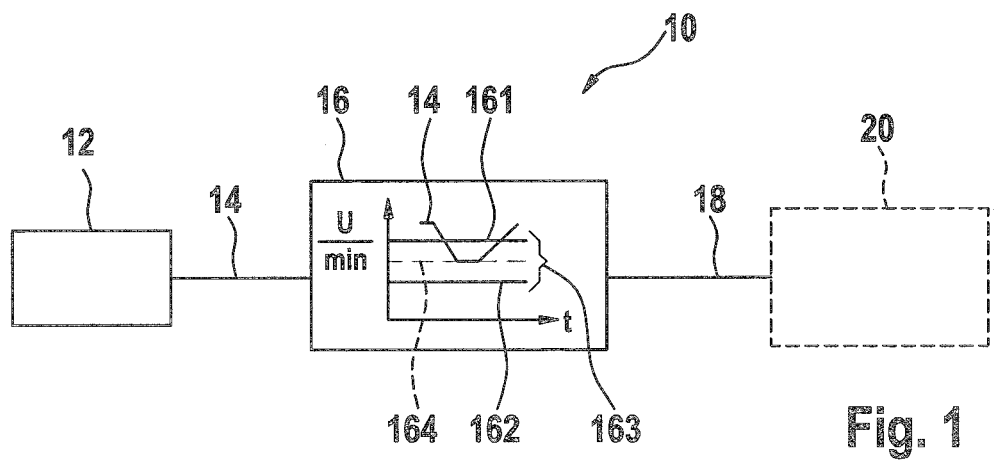
FIG. 1 shows a block diagram of an exemplary embodiment of the present invention as a device.

Identical or similar elements may have the same or similar reference numerals in the following figures. Furthermore, possibly indicated dimensions and measures are only exemplary such that the present invention is not limited to these dimensions and measures. Furthermore, the figures of the drawings, their description as well as the described subject matter contain numerous features in combination. One skilled in the art will know that these features may also be considered individually or that they may be united in additional combinations that are not explicitly described here.

FIG. 1 shows a block diagram of a first exemplary embodiment of the present invention. In this instance, device 10 includes a unit 12 for providing an engine speed signal 14 that corresponds to the speed of a motor vehicle engine. This unit 12 may be for example a speed sensor on a shaft of the engine or on the transmission of the motor vehicle. Engine speed signal 14 is supplied to a brake interruption unit 16, in which an interruption signal 18 is determined. Interruption signal 18 may be determined in such a way that engine speed signal 14 is compared to threshold value 161, which is greater than an engine stop threshold value 162 at which the engine of the motor vehicle stalls (that is, stops). If engine speed signal 14 signals a speed of the engine of the motor vehicle that is lower than threshold value 161, then interruption signal 18 signals an automatic brake unit 20 (which may be an ESP system, for example) to interrupt or at least attenuate a possibly currently performed automatic brake operation. Thus it is possible to ensure that the engine of a motor vehicle does not stall as a consequence of the automatic brake operation of automatic brake unit 20.

Furthermore, by using threshold value 161, which is greater than engine stop threshold value 162, it is possible to ensure that a appropriate reaction time of automatic brake unit 20 may be taken into account as well. This is important particularly because automatic brake unit 20 must control mechanical components that are subject to a mass inertia. If the interruption or attenuation of the automatic brake operation is initiated too late, then the engine of the motor vehicle can no longer be prevented from stalling.

In accordance with the exemplary embodiments and/or exemplary methods of the present invention, a kind of "safety buffer" 163 is thus provided in order to interrupt the automatic brake operation in a timely manner. Threshold value 161 may be 800 revolutions per minute, for example, whereas the engine stop threshold value of a hypothetical vehicle engine is e.g. 600 revolutions per minute. "Safety buffer" 163 then amounts to 200 revolutions per minute, which is sufficient in modern brake systems to effect an interruption or attenuation of the automatic brake operation in a timely manner. FIG. 1 shows such an evaluation of engine speed signal 14, in which the speed is reduced by the automatic brake operation (for example using brake unit 20) below threshold value 161, after which brake interruption unit 16 triggers an interruption or attenuation of the brake operation via interruption signal 18. Afterwards, the speed of the engine of the motor vehicle rises again (caused by a downhill gradient for example), which causes engine speed signal 14 to rise again. The approach according to the exemplary embodiments and/or exemplary methods of the present invention thus ensures that the engine of the motor vehicle does not stall.

In the event that an interruption or attenuation of the automatic brake operation has occurred, there may also be a provision for a new brake operation to be initiated only after the motor vehicle engine has reached an increased minimum speed. This may be accomplished, for example, by comparing engine speed signal 14 to a brake enabling threshold value 164. If engine speed signal 14 assumes a value that is greater than brake enabling threshold value 164, then in principle a brake operation may be performed again until it is possibly again interrupted or attenuated by brake interruption unit 16. If threshold value 161 is 800, as in the above-mentioned example, then brake enabling threshold value 164 could have a value of 900 rpm. The vehicle is then decelerated until the brake operation is interrupted at an engine speed of 800 rpm in order to prevent the engine from stalling. If the rotational speed increases, for example due to a downhill gradient, and exceeds the brake enabling threshold value, then the brake operation resumed.

The advantage of the exemplary embodiments and/or exemplary methods of the present invention is therefore that, when using an appropriate braking strategy, the engine of the vehicle does not stall if, following the automatic brake operation, the driver must still have the option of moving the vehicle out of a danger zone. If the brake operation is triggered in a situation in which the engine stalls anyway because to the vehicle movement, the braking effect of the safety system is maintained. The engine is prevented from stalling by interrupting the automatic brake operation, which is achieved solely on the basis of the available information regarding the engine speed.

Figure 2:
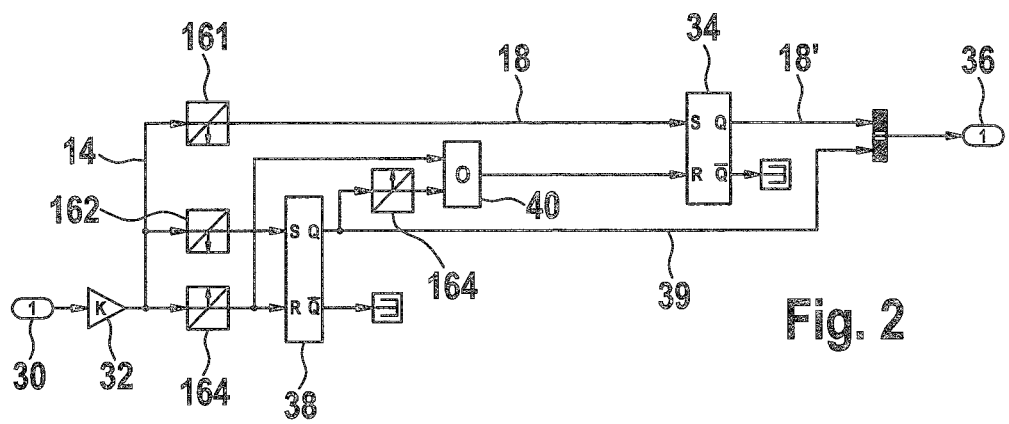
FIG. 2 shows a circuit diagram of another exemplary embodiment of the present invention, which represents a possible implementation of the present invention in a logic circuit.

FIG. 2 shows a circuit diagram of an exemplary embodiment of the device according to the present invention in the form of a logic circuit. First, engine speed 30 is measured by a sensor 32, which is for example the unit 12 for supplying the engine speed signal. This sensor 32 then supplies engine speed signal 14, which is checked to determine whether it has fallen below threshold value 161. Alternatively, unit 12 for supplying the engine speed signal may also be a pin, via which the already ascertained engine speed signal is made available for further processing, specifically for checking whether threshold value 161 has been undershot. If engine speed signal 14 falls below threshold value 161, then an interruption signal 18 is generated, which is stored in an interruption memory unit 34. This interruption memory unit 34 may be a flip-flop, for example, which is set by interruption signal 18. The interruption signal 18' stored by memory unit 34 is output via output 36 in order, for example, to interrupt or attenuate the automatic brake operation by an automatic brake unit 20 (as shown in FIG. 1).

If it is detected that engine speed signal 14 assumes a value that lies below engine stop threshold value 162, then the inference must be drawn that the engine of the motor vehicle has stalled. This means that device 10 must store information about the motor vehicle engine being at rest. This information may be stored, for example, in engine stop state memory 38. If engine stop state memory 38 is also a flip-flop, then this may be set when engine speed signal 14 falls below engine stop threshold value 162. This set engine stop signal 39 may be able to be tapped externally so as to be used by additional functions. In the first instance, however, it is used to reset interruption memory unit 34 using a reset signal 165 and thus to end the interruption of the brake operation. Since the engine stalled during the interruption of the brake operation, a continuation of the brake operation is permitted.

In such a case, in spite of the interruption or attenuation of the brake operation, it is possible to make further use of the fact that the engine speed signal continues to fall below the engine stop threshold value. For it is possible to obtain from this information an indication that the vehicle is possibly in a state of skidding.

In addition, set interruption signal 18' stored in interruption memory unit 34 may be reset even if engine speed signal 14 assumes a value that is greater than brake enabling threshold value 164. In this case it is recognized that the engine speed has increased again because of the attenuated or interrupted brake operation such that the automatic brake operation may be continued without the engine being in danger of stalling.

Since the two conditions, that the engine has stalled or that the engine speed has again reached a non-critical value in terms of stalling, are able to reset interruption memory unit 34 in FIG. 2, they are linked to each other by a logical OR 40.

The approach of the exemplary embodiments and/or exemplary methods of the present invention (according to the circuit diagram shown in FIG. 2) ensures in a simple way that a stalling of the engine in a vehicle (having a manual transmission, for example) is not caused by an automatic brake intervention of a safety function. This is ensured by the fact that the engine speed (which is provided by the engine control unit) is constantly monitored. If the engine speed falls below a threshold 161 for a speed that is critical in terms of stalling, then an interruption signal 18 is set in interruption memory unit 34, and the automatic brake operation is interrupted or attenuated. This ensures that the speed is not further reduced by the automatic brake operation and that the engine does not stall.

If the vehicle is in a state of skidding, then it is indeed possible for the speed to continue to drop due to the physics of driving and for the engine to stall. But this is then attributable to the motion of the vehicle and not to the automatic brake operation.

This "stalling" is detected when engine stalling speed threshold 162 is undershot, whereupon this state is set in an engine stop memory 38 and an engine stop signal 39 is output. In this case, the automatic brake operation may be continued in order to improve the protective effect of the safety function. The engine stalled in any event such that the continuation of the automatic brake operation does not cause a deterioration of the driver's options to act. In the example shown, the termination of the interruption of the brake operation is triggered by the fact that by setting the state stored in engine stop state memory 38 the state stored in interruption memory unit 34 is reset.

The state stored in engine stop state memory 38 is reset if the engine speed exceeds a restart threshold 164 at which it may be assumed that the engine is running properly again. In this case, the brake operation may be resumed as well.

Figure 3:
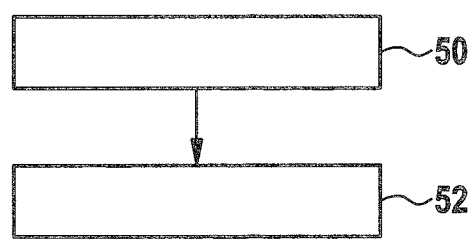
FIG. 3 shows a flow chart of an exemplary embodiment of the present invention as a method.

FIG. 3 shows a flow chart of another exemplary embodiment of the present invention as a method. In a first step 50, an engine speed signal is provided which corresponds to the speed of the motor vehicle engine. This engine speed signal is evaluated in a second step 52, and an automatic brake operation is interrupted or attenuated if the engine speed signal assumes a value that lies below a predetermined threshold value that is greater than an engine stop threshold value that indicates a minimum speed of the motor vehicle engine.

What is claimed is:

1. A device for preventing a motor vehicle engine from stopping in an automatic brake operation during a motor vehicle accident situation, comprising:
   an emergency brake activation detector to detect an activation of the automatic brake operation in the motor vehicle accident situation;
   a engine speed unit to provide an engine speed signal that corresponds to a speed of the motor vehicle engine; and
   a brake interruption unit to, responsive to the detected activation of the automatic brake operation at the emergency brake activation detector, at least one of interrupt and attenuate the brake operation if the engine speed signal has a value that lies below a predetermined threshold value, wherein the threshold value is greater than an engine stop threshold value that indicates a minimum speed of the motor vehicle engine.

2. The device of claim 1, wherein the brake interruption unit is configured to resume the automatic brake operation if the engine speed signal has a value that lies below the engine stop threshold value.

3. The device of claim 1, wherein the brake interruption unit is configured so that, following an interruption of the automatic brake operation, another brake operation is again made possible if the engine speed signal has a value that is greater than a brake enabling threshold value.

4. The device of claim 3, wherein the brake interruption unit is configured to use a brake enabling threshold value that is greater than the engine stop threshold value.

5. The device of claim 3, wherein the brake interruption unit is configured to use a brake enabling threshold value that is greater than the threshold value.

6. The device of claim 1, wherein the brake interruption unit includes a logic structure.

7. A method for preventing a motor vehicle engine from stopping in an automatic brake operation during a motor vehicle accident situation, the method comprising:
   detecting, via a brake activation detector, an activation of the automatic brake operation in the motor vehicle accident situation;
   providing an engine speed signal that corresponds to the speed of the motor vehicle engine; and
   responsive to the detected activation of the automatic brake operation, at least one of interrupting and attenuating the brake operation if the engine speed signal has a value that lies below a predetermined threshold value, wherein the threshold value is greater than an engine stop threshold value that indicates a minimum speed of the motor vehicle engine.

8. A non-transitory computer readable medium having a computer program, which is executable by a processor, comprising:
   a program code arrangement having program code for preventing a motor vehicle engine from stopping in an automatic brake operation during a motor vehicle accident situation, by performing the following:
   detecting an activation of the automatic brake operation in the motor vehicle accident situation;
   providing an engine speed signal that corresponds to the speed of the motor vehicle engine; and
   responsive to the detected activation of the automatic brake operation, at least one of interrupting and attenuating the brake operation if the engine speed signal has a value that lies below a predetermined threshold value, wherein the threshold value is greater than an engine stop threshold value that indicates a minimum speed of the motor vehicle engine.

9. The method of claim 7, wherein a brake interruption unit is configured to resume the automatic brake operation if the engine speed signal has a value that lies below the engine stop threshold value.

10. The method of claim 7, wherein a brake interruption unit is configured so that, following an interruption of the automatic brake operation, another brake operation is again made possible if the engine speed signal has a value that is greater than a brake enabling threshold value.

11. The method of claim 9, wherein a brake interruption unit is configured to use a brake enabling threshold value that is greater than the engine stop threshold value.

12. The method of claim 9, wherein a brake interruption unit is configured to use a brake enabling threshold value that is greater than the threshold value.

13. The method of claim 7, wherein a brake interruption unit includes a logic structure.

14. The device of claim 1, wherein the brake interruption unit is configured to resume the automatic brake operation if the engine speed signal has a value that lies below the engine stop threshold value, and wherein the brake interruption unit is configured so that, following an interruption of the automatic brake operation, another brake operation is again made possible if the engine speed signal has a value that is greater than a brake enabling threshold value.

15. The device of claim 14, wherein the brake interruption unit is configured to use a brake enabling threshold value that is greater than the engine stop threshold value.

16. The device of claim 15, wherein the brake interruption unit includes a logic structure.

17. The device of claim 14, wherein the brake interruption unit is configured to use a brake enabling threshold value that is greater than the threshold value.

18. The device of claim 17, wherein the brake interruption unit includes a logic structure.

19. The device of claim 14, wherein the brake interruption unit includes a logic structure.

* * * * *